(12) United States Patent
Lien (10) Patent No.: US 12,538,999 B2
(45) Date of Patent: Feb. 3, 2026

(54) GRILL

(71) Applicant: Mor Designs Ltd., Taipei (TW)

(72) Inventor: Hung-Mei Lien, Taipei (TW)

(73) Assignee: MOR DESIGNS LTD., Taipei (TW)

( * ) Notice: Subject to any disclaimer, the term of this patent is extended or adjusted under 35 U.S.C. 154(b) by 384 days.

(21) Appl. No.: 18/127,885

(22) Filed: Mar. 29, 2023

(65) Prior Publication Data

US 2024/0277183 A1 Aug. 22, 2024

(30) Foreign Application Priority Data

Feb. 21, 2023 (CN) .......................... 202320355739.9

(51) Int. Cl.
*A47J 37/06* (2006.01)
*A47J 37/07* (2006.01)

(52) U.S. Cl.
CPC ....... *A47J 37/0652* (2013.01); *A47J 37/0786* (2013.01)

(58) Field of Classification Search
CPC .......................... A47J 37/0652; A47J 37/0786
USPC .......................................................... 126/1 R
See application file for complete search history.

(56) References Cited

U.S. PATENT DOCUMENTS

| 4,508,097 A | * | 4/1985 | Berg | ................... | A47J 37/0682 |
| | | | | | 126/41 R |
| 2009/0038605 A1 | * | 2/2009 | Dahle | ................. | A47J 37/0704 |
| | | | | | 126/25 R |
| 2022/0090791 A1 | * | 3/2022 | Hwang | ..................... | F24B 3/00 |

* cited by examiner

*Primary Examiner* — Avinash A Savani
(74) *Attorney, Agent, or Firm* — CANTOR COLBURN LLP (57) ABSTRACT

A grill, including a support assembly, a grill assembly, an iron plate assembly, and a heating assembly. The grill assembly, the iron plate assembly, and the heating assembly are mounted on the support assembly. The grill assembly is located below the heating assembly, and the iron plate assembly is located above the heating assembly. A reflective structure is covered over an upper area above the heating assembly, and the reflective structure is in contact with the iron plate assembly. The upper area of the heating assembly is covered with the reflective structure, and the reflective structure is in contact with the iron plate assembly. Heat is reflected to the grill assembly underneath the heating assembly. As the reflective structure also absorbs heat, thus the heat can also be conducted to the iron plate assembly through the reflective structure to heat the food on the iron plate assembly.

18 Claims, 9 Drawing Sheets

GRILL

CROSS-REFERENCE TO RELATED APPLICATIONS

This application claims the benefit of Chinese patent application No. 202320355739.9 filed on Feb. 21, 2023, the entire contents of which are incorporated herein by reference.

TECHNICAL FIELD

The present application relates to barbecue equipment, and more specifically, relates to a grill.

BACKGROUND

Barbecue is one of the most popular cooking methods in modern life, especially in some gatherings, barbecue is usually one of the best cooking methods. Having a barbecue can not only taste delicious food but also allow people to participate in and experience the fun of cooking which enhances the relationship between people. However, a large amount of oil fumes are usually produced during the barbecue, and these oil fumes are likely to cause adverse effects on people's health.

At present, there is a kind of smokeless grill in the market, which, by placing the heat source above the food to heat the food, avoids the dripping of the oil juice onto the heat source, thereby effectively avoiding the oil from burning and producing smoke. However, this kind of smokeless grill usually has a single function that only grills food under the heat source. Also, because the air will rise after being heated, the heat in the rising air cannot be used to heat the food below the heat source, which causes a lot of heat to be wasted, and the energy utilization efficiency is low.

In summary, it can be seen that the function of the smokeless grill in existing technology is relatively single, and the energy utilization efficiency is relatively low.

SUMMARY

Embodiments of the present application provide a grill, which overcomes the technical problems of the single function and low energy utilization efficiency in the existing technology.

The present application provides a grill, which includes a support assembly, a grill assembly, an iron plate assembly, and a heating assembly. The grill assembly, the iron plate assembly, and the heating assembly are all mounted on the support assembly. The grill assembly is located below the heating assembly, and the iron plate assembly is located above the heating assembly. A reflective structure is covered over an upper area above the heating assembly, and the reflective structure is in contact with the iron plate assembly.

In a possible design, a first ventilation opening extends through a sidewall of the reflective structure.

In a possible design, a shielding structure is covered on one side of the first ventilation opening away from the heating assembly, and the shielding structure is connected to the sidewall of the reflective structure. A first opening is located between the shielding structure and the sidewall of the reflective structure, and the first opening is in communication with the first ventilation opening and faces upward or downward.

In a possible design, the support assembly includes a furnace box having an inner cavity. A mounting plate is placed in the inner cavity, and the heating assembly is mounted on the mounting plate, the grill assembly is mounted on a bottom part of the inner cavity, and the iron plate assembly is mounted on a top part of the furnace box.

In a possible design, the heating assembly has an air inlet, and the furnace box is provided with a second ventilation opening facing the air inlet.

In a possible design, the grill assembly includes a grill grid, and sliding rails are arranged in the inner cavity, the furnace box has a second opening in communication with the inner cavity, the grill grid is slidably mounted on the sliding rails.

In a possible design, a first oil collector is detachably mounted on the support assembly and is positioned under the grill grid.

In a possible design, a guiding structure is disposed between the first oil collector and the grill grid, the guiding structure is provided with a first oil outlet, the first oil collector has a first oil inlet, and the first oil outlet is located above the first oil inlet.

In a possible design, the iron plate assembly has a second oil outlet, and the second oil outlet is communicated with a second oil collector, so that oil in the iron plate assembly enters the second oil collector through the second oil outlet.

In a possible design, a top cover is covered above the iron plate assembly.

The advantageous effects of the grill provided by the present application compared with the existing technology are summarized as follows: in the grill provided by the present application, the grill assembly is disposed below the heating assembly, and the iron plate assembly is disposed above the heating assembly, so that, in addition to realizing smokeless grill, the food on the iron plate assembly is heated by the heat in the rising air being heated by the heating assembly, therefore, the grill provided by the present application can simultaneously achieve two cooking methods of grilling and teppanyaki. Since the upper area of the heating assembly is also covered with the reflective structure, the heat is reflected to the grill assembly underneath the heating assembly through the reflective structure, thereby effectively reducing heat dissipation and improving heat utilization. As the reflective structure itself will also absorb part of the heat while reflecting the heat, thus heat can be conducted to the iron plate assembly from the reflective structure through the contact therebetween to heat the food on the iron plate assembly, which further improves utilization of the heat, that is, the utilization of energy.

BRIEF DESCRIPTION OF THE DRAWINGS

In order to more clearly illustrate the detailed embodiments of the present application or technical proposals in the existing technology, accompanying drawings that are used in the description of the embodiments or existing technologies are briefly introduced hereinbelow. It is understood that the drawings in the following description are merely some embodiments of the present application. For those skilled in the art, other drawings can also be obtained according to these drawings without any creative effort.

Reference signs shown in the above drawings are as follows:

100 grill assembly; 110 grill grid; 120 sliding support; 130 first oil collector; 131 first oil inlet; 140 guiding structure; 141 first oil outlet; 200 heating assembly; 210 burner structure; 220 protective case; 221 air intake nozzle; 222 air inlet; 300 iron plate assembly; 310 grill pan; 311 second oil outlet; 320 reinforcing rod; 330 second oil collector; 340 guiding groove; 400 support assembly; 410 furnace box; 411 second opening; 412 second ventilation opening; 413 mounting plate; 414 first chamber; 415 second chamber; 416 inner cavity; 417 sliding rail; 420 upper cover; 430 movable frame; 431 door; 432 wheel; 440 side grill assembly; 450 side platform assembly; 500 reflective structure; 510 shielding structure; 520 sidewall; 530 first ventilation opening; and 540 first opening.

DETAILED DESCRIPTION OF THE EMBODIMENTS

In order to make the purpose, technical proposals, and advantages of the present application more clearly understood, the present application will be described in further detail hereinbelow with reference to the accompanying drawings and embodiments. It should be understood that the specific embodiments described herein are merely used to explain the present application, but not to limit the present application.

It should be noted that when an element is referred to as being "fixed" or "disposed on" another element, it may be directly on the other element or indirectly on the other element. When an element is referred to as being "connected to" another element, it can be directly connected to the other element or indirectly connected to the other element.

It should be understood that the orientations or positional relationships indicated by terms "length", "width", "upper", "lower", "front", "rear", "left", "right", "vertical", "horizontal", etc. are based on the orientations or positional relationships shown in the drawings, and are only for the convenience of describing the application and simplifying the description, rather than indicating or implying the structures or elements referred to necessarily having a particular orientation, being constructed, and operating in a particular orientation, thus should not be construed as limiting the application.

Furthermore, the terms "first" and "second" are merely used for descriptive purposes and cannot be interpreted as indicating or implying relative importance or implying the number of indicated technical features. Thus, a feature defined as "first" or "second" may expressly or implicitly include one or more of the features. In the description of the present application, "a plurality of" means two or more, unless otherwise specifically defined.

In order to illustrate the technical proposals described in the present application, explanation is described below in conjunction with detailed embodiments and accompanying drawings.

Figure 1:
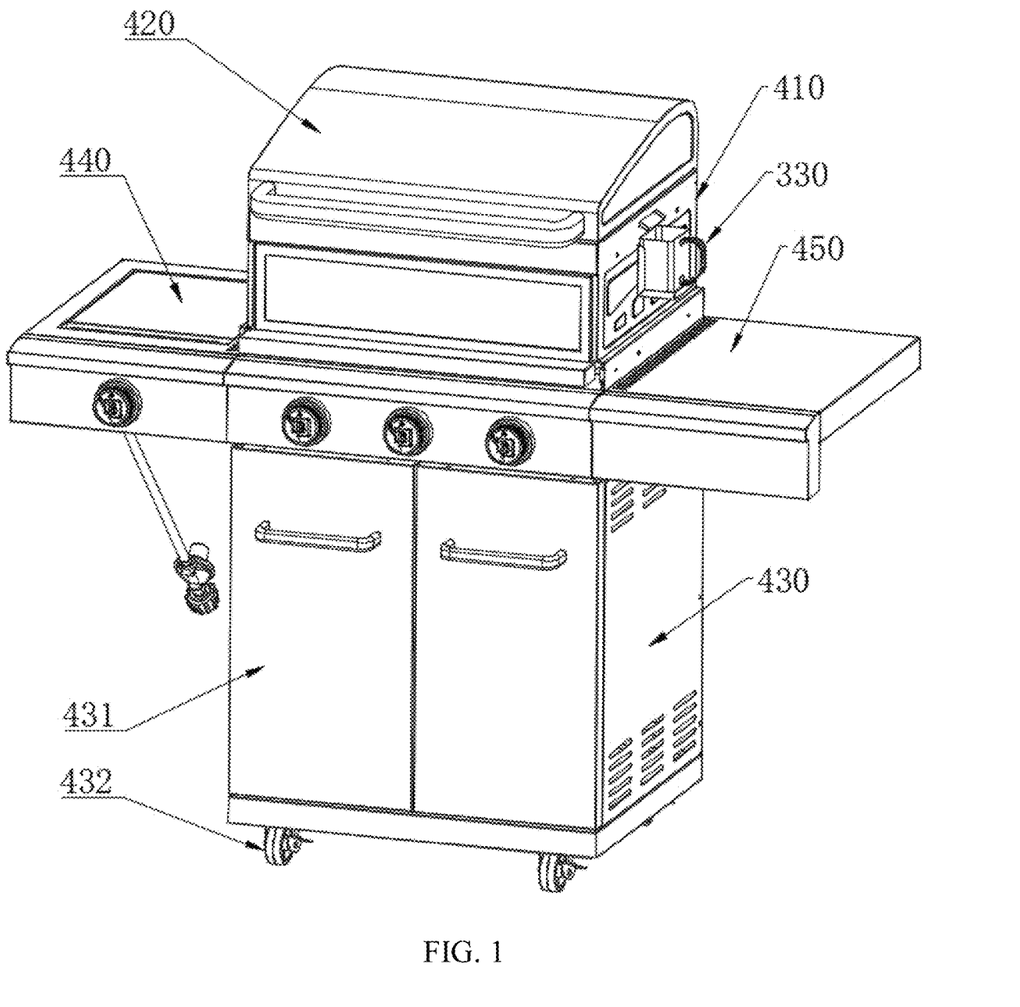
FIG. 1 is an overall structural view of the grill according to an embodiment of the present application.
Figure 2:
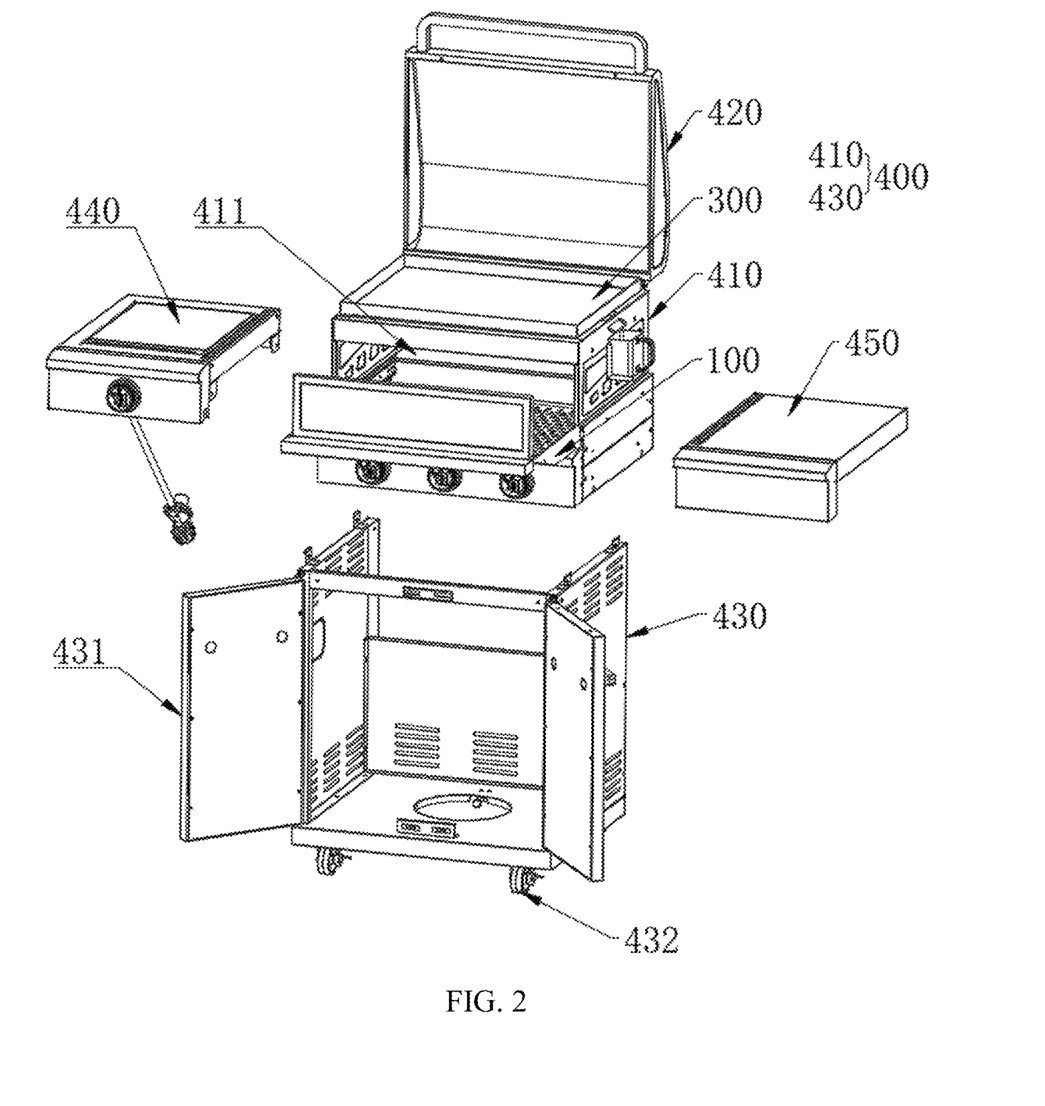
FIG. 2 is an exploded view of the grill according to an embodiment of the present application.
Figure 3:
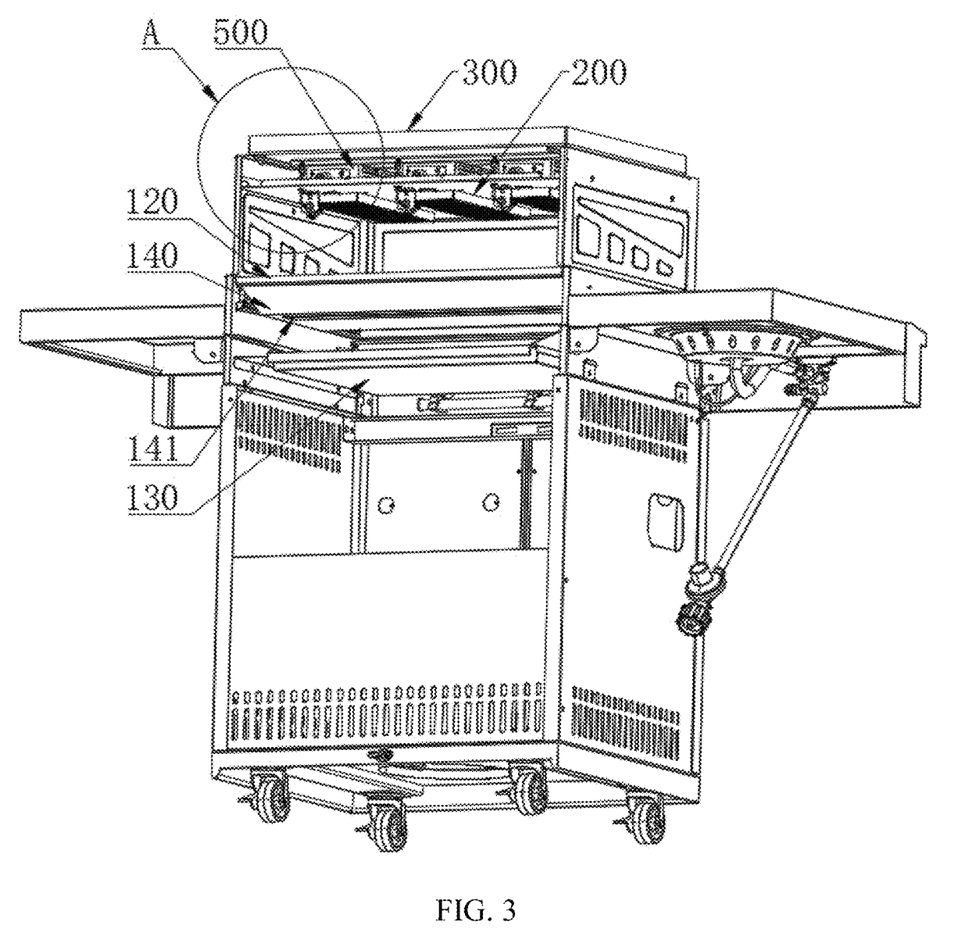
FIG. 3 is a first partial view of the grill according to an embodiment of the present application.

As shown in FIGS. 1 to 3, an embodiment of the present application provides a grill, which includes a support assembly 400, a grill assembly 100, an iron plate assembly 300, and a heating assembly 200, and the grill assembly 100, the iron plate assembly 300, and the heating assembly 200 are all mounted on the support assembly 400. The grill assembly 100 is located below the heating assembly 200, and the iron plate assembly 300 is located above the heating assembly 200. A reflective structure 500 is covered on an upper area above the heating assembly 200, and the reflective structure 500 is in contact with the iron plate assembly 300.

Compared with the existing technology, in the grill of the present application, the grill assembly 100 and the iron plate assembly 300 are both used to place food, and by arranging the grill assembly 100 under the heating assembly 200, oil in the food placed on the grill assembly 100 can be effectively prevented from dripping onto the heating assembly 200, thereby effectively avoiding smoke produced by the burning of the oil, and achieving a smokeless barbecue. At the same time, the iron plate assembly 300 is disposed above the heating assembly 200, so that the food on the iron plate assembly 300 can be heated by the heat in rising air being heated by the heating assembly 200, thereby realizing cooking teppanyaki above the heating assembly 200. Since the upper area of the heating assembly 200 is also covered with the reflective structure 500, the heat is reflected to the grill assembly 100 underneath the heating assembly 200 through the reflective structure 500, thereby effectively reducing heat dissipation and improving heat utilization. As the reflective structure 500 itself will also absorb part of the heat while reflecting the heat, thus heat can be conducted to the iron plate assembly 300 from the reflective structure 500 through the contact therebetween to heat the food on the iron plate assembly 300, which further improves utilization of the heat, that is, the utilization of energy.

Figure 4:
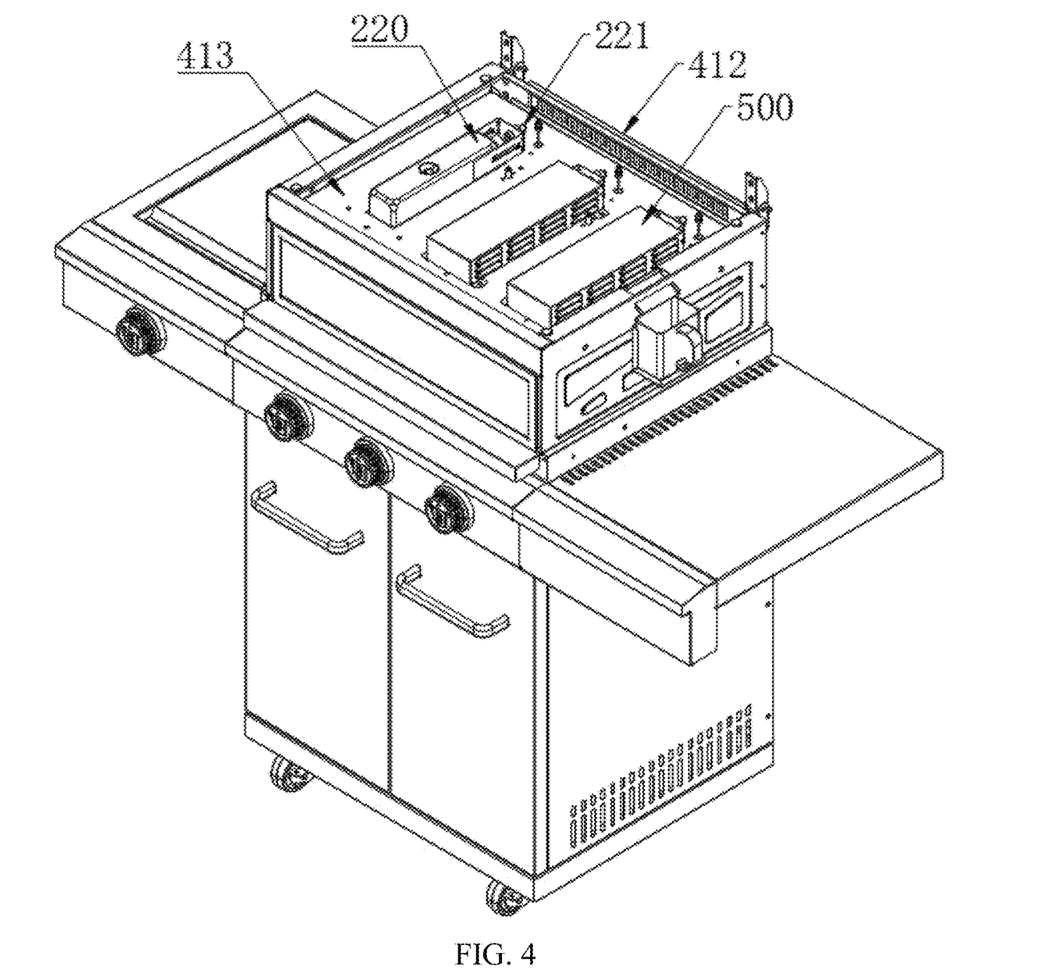
FIG. 4 is a second partial view of the grill according to an embodiment of the present application.
Figure 5:
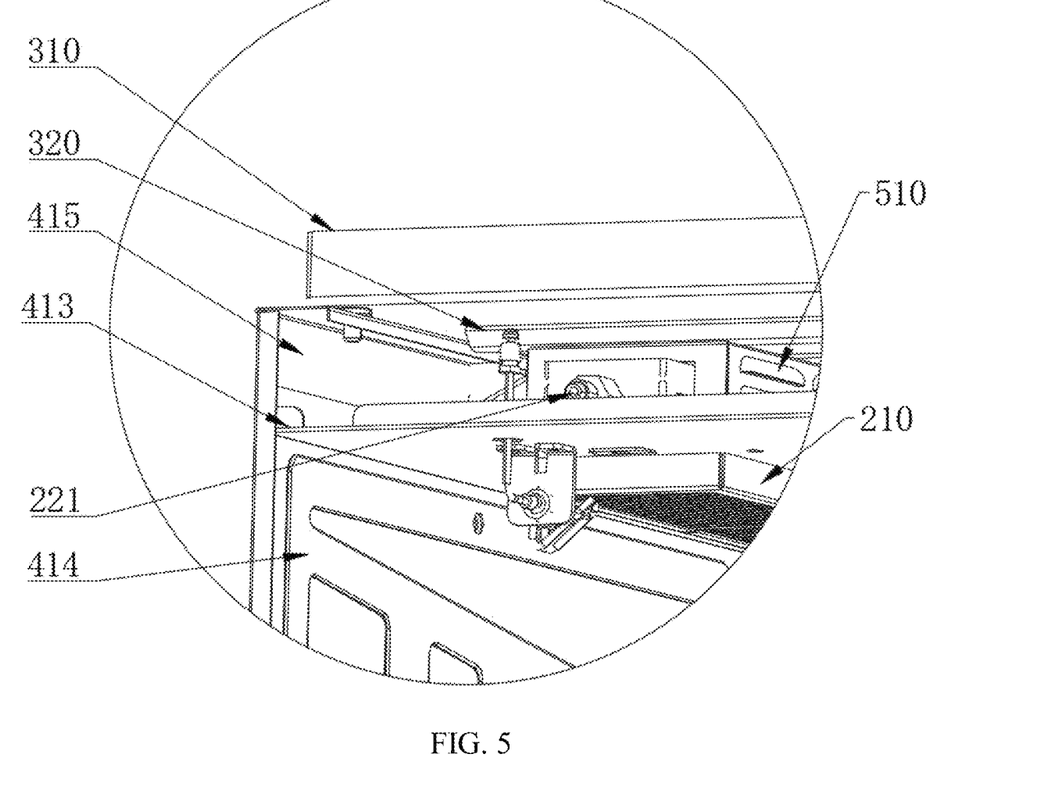
FIG. 5 is a partially enlarged view of area A in FIG. 3.

In a specific embodiment, as shown in FIGS. 4 and 5, the heating assembly 200 includes a burner structure 210) and a protective case 220, and the burner structure 210) is used for emitting flames. The protective case 220 is arranged on a back side of the burner structure 210. It should be noted that the side from which the burner structure 210 emits flames is the front side of the burner structure 210), and the opposite side thereto is the back side of the burner structure 210). The protective case 220) is used to protect the burner structure 210 and prevent impurities or rainwater from entering the burner structure 210. An air inlet 222 is opened on one side of the protective case 220 to allow air circulation inside the protective case 220, so as to continuously provide oxygen to the burner structure 210 and ensure that continuous flames from the burner structure 210. The front side of the burner structure 210 faces the grill assembly 100 so as to allow the food on the grill assembly 100 to absorb enough heat. In this embodiment, the grill assembly 100 is located below the heating assembly 200, so the front side of the burner structure 210 faces downward, and the protective case 220 is placed on the back side of the burner structure 210, that is, the protective case 220 is mounted above the burner structure 210. Specifically, the burner structure 210 may be, but not limited to, an infrared burner or a conventional burner.

Figure 8:
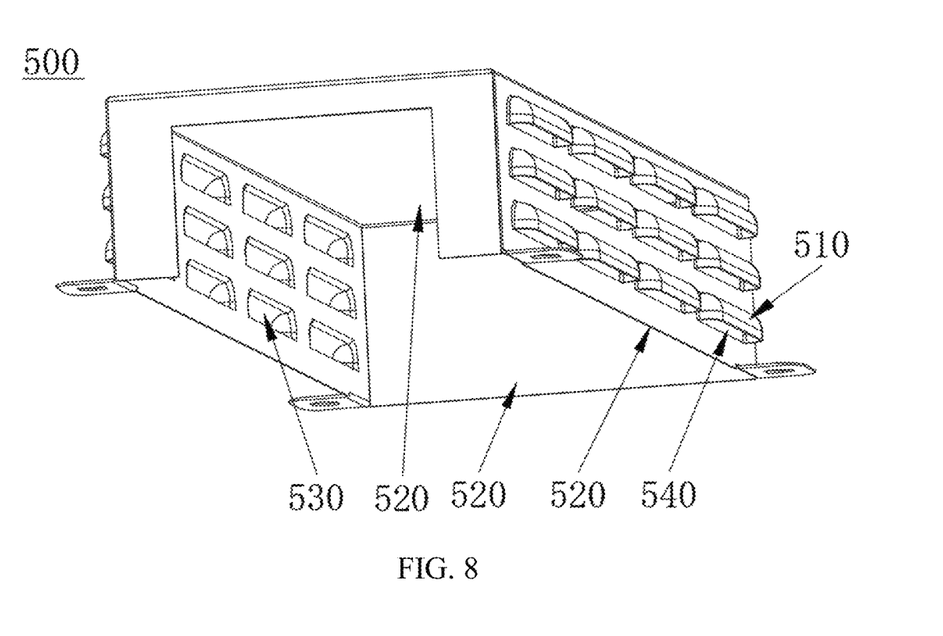
FIG. 8 is a structural view of the reflective structure of the grill according to an embodiment of the present application.

In a possible design, as shown in FIG. 8, a first ventilation opening 530) is provided on a sidewall 520 of the reflective structure 500 and extends therethrough. The heat of the air near one side of the reflective structure 500 close to the heating assembly 200 is high, while the heat of the air near the other side of the reflective structure 500 away from the heating assembly 200 is relatively low. For ease of description, the side of the reflective structure 500 close to the heating assembly 200 is referred to as the inner side of the reflective structure 500, and the side away from the heating assembly 200 is referred to as the outer side of the reflective structure 500. By providing the first ventilation opening 530, the air inside and outside the reflective structure 500) is able to flow; with the air of higher heat on the inner side of the reflective structure 500 flowing out of the reflective structure 500, and the air of lower heat on the outer side of the reflective structure 500 flowing into the reflective structure 500, thereby realizing heat circulation. Part of the air with higher heat flows out from the inner side of the reflective structure 500 and rises to the iron plate assembly 300, so that the heat is conducted to the iron plate assembly 300. The iron plate assembly 300 can not only be heated by the reflective structure 500, but also be heated by the hot air under the iron plate assembly 300. This not only increases the heat absorbed by the iron plate assembly 300, but also improves the uniformity of heating of the iron plate assembly 300.

In a specific embodiment, the reflective structure 500 is specifically covered on the protective case 220, so that part of the heat dissipated out of the protective case 220 is reflected down to the grill assembly 100 by the reflective structure 500. The reflective structure 500 is specifically composed of one or more reflective plates. For example, the reflective structure 500 includes a plurality of reflective plates, which are respectively a front plate, a rear plate, side plates, and a top plate, the number of the side plates is two, and the number of other plates is respectively one. The rear plate is located on a side of the protective case 220 that is provided with the air inlet 222, the front plate is located on a side of the protective case 220 opposite to the air inlet 222, and the two side plates are spaced apart between the front plate and the rear plate, on opposite sides of the protective case 220. The top plate is located on a side of the protective case 220 away from the burner structure 210.

In some optional embodiments, the number of the first ventilation opening 530 may be one or more. When the number of the first ventilation opening 530 is one, the first ventilation opening 530) may be located on any one of the front plate, the rear plate, and the side plates. When there are a plurality of first ventilation openings 530, the first ventilation openings 530 may be distributed at intervals on one or more reflective plates. For example, a plurality of first ventilation openings 530 are distributed at intervals on two side plates, respectively, so as to facilitate heat circulation from opposite sides of the protective case 220, thereby further improving the uniformity of heat absorbed by the iron plate assembly 300.

In a possible design, as shown in FIGS. 2-5 and 8, a shielding structure 510 is arranged on one side of the first ventilation opening 530 away from the heating assembly 200. When the number of the first ventilation opening 530 is more than one, a shielding structure 510 is arranged corresponding to each first ventilation opening 530. The shielding structure 510 is connected to a sidewall 520 of the reflective structure 500, and a first opening 540 in communication with the first ventilation opening 530 is provided between the shielding structure 510 and the sidewall 520 of the reflective structure 500. The first opening 540 faces upward or downward. When the first opening 540) faces upward, that is, the first opening 540 faces the iron plate assembly 300, accordingly, the air with higher heat inside the reflective structure 500 can quickly rise to the iron plate assembly 300, so as to reduce heat dissipation during the rising of the air, thereby improving the utilization efficiency of the heat. When the first opening 540 faces downward, the shielding structure 510 can protect the first ventilation opening 530 from impurities or rainwater, so that rainwater is prevented from entering the reflective structure 500. It should be noted that the first opening 540) may face vertically upward or obliquely upward, and the first opening 540 may face vertically downward or obliquely downward.

In some specific embodiments, the shielding structure 510 and the reflective structure 500 may be integrally formed. As shown in FIG. 5, the shielding structure 510 protrudes from the outer surface of the side plate. Alternatively, the shielding structure 510 is movably connected with the reflective structure 500, specifically, the shielding structure 510 is movably connected with the corresponding side plate, and the shielding structure 510 is rotatable relative to the side plate to adjust the orientation of the first opening 540. The orientation of the first opening 540 may be set upward on sunny days, and the orientation of the first opening 540 may be set downward on rainy days. For example, the shielding structure 510 is a louver structure including blinds, which are rotatably mounted on the side plate, and the orientation of the first opening 540 can be adjusted by changing the tilted direction of the blinds.

Figure 9:
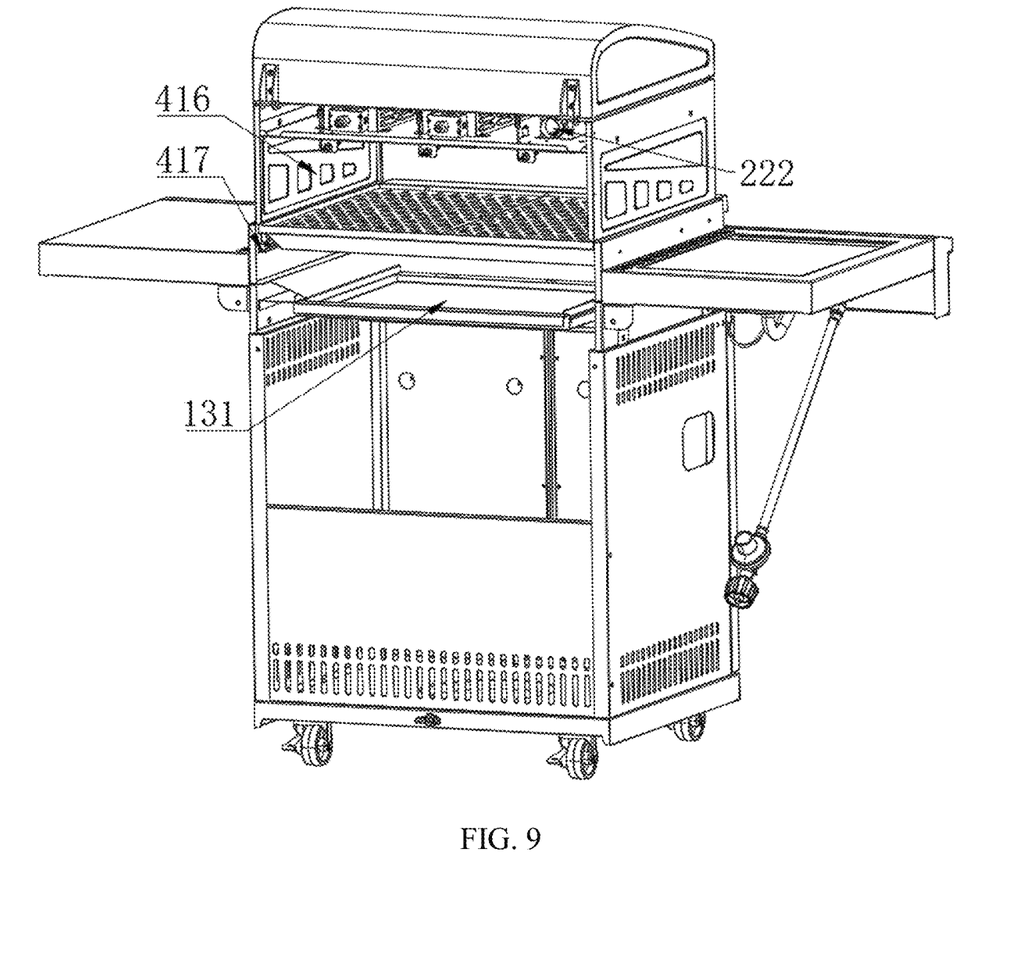
FIG. 9 is a fifth partial view of the grill according to an embodiment of the present application.

In some possible designs, the support assembly 400 may include a bracket on which the grill assembly 100, the heating assembly 200, and the iron plate assembly 300 are all mounted. Alternatively, as shown in FIGS. 1, 5 and 9, the support assembly 400 includes a furnace box 410, which has an inner cavity 416, and a mounting plate 413 is arranged in the inner cavity 416. The heating assembly 200 is mounted on the mounting plate 413, the grill assembly 100 is mounted on a bottom part of the inner cavity 416, and the iron plate assembly 300 is mounted on the top part of the furnace box 410. By providing the furnace box 410, on the one hand, heat can be prevented from being dissipated to the surrounding environment, and on the other hand, wind and dust can be prevented. By providing the mounting plate 413, the heating assembly 200 is mounted in the inner cavity 416, the grill assembly 100 is further mounted on the bottom part of the inner cavity 416, and the iron plate assembly 300 is mounted on the top part of the furnace box 410, so that the grill assembly 100 is located below the heating assembly 200, and the iron plate assembly 300 is located above the heating assembly 200.

In a specific embodiment, the mounting plate 413 is horizontally disposed in the inner cavity 416, and a mounting opening is provided on the mounting plate 413. The burner structure 210 is mounted on a bottom surface of the mounting plate 413, and the protective case 220 is mounted on a top surface of the burner structure 210, and the protective case 220 protrudes from an upper surface of the mounting plate 413 through the mounting opening. The reflective structure 500 is mounted on the upper surface of the mounting plate 413. The front plate, the rear plate, and the two side plates of the reflective structure 500 are respectively mounted vertically on the upper surface of the mounting plate 413, and the top plate thereof covers the front plate, the rear plate, and the two side plates, so that a cavity communicated with the mounting opening is formed between the reflective structure 500 and the mounting plate 413. The protective case 220) protrudes from the upper surface of the mounting plate 413 through the mounting opening and is located in the cavity, so as to cover the reflective structure 500 on the protective case 220.

Optionally, the number of heating assemblies 200 may be multiple, and a plurality of heating assemblies 200 are mounted on the mounting plate 413 at intervals. The heating effect can be improved by arranging the plurality of heating assemblies 200. The plurality of heating assemblies 200 may be mounted on the mounting plate 413 spaced evenly apart, so as to improve the heating uniformity of the grill assembly 100 and the iron plate assembly 300. When the number of heating assemblies 200 is multiple, then the number of mounting openings on the mounting plate 413 and the number of reflective structures 500 are also multiple, and the mounting openings and the reflective structures 500 are respectively arranged corresponding to each heating assembly 200. As shown in FIG. 4, the number of the heating assemblies 200 is three, and correspondingly, the number of the mounting openings is also three. The three mounting openings are evenly spaced on the mounting plate 413, with each protective case 220 extending into each of the mounting openings correspondingly, and each protective case 220 is covered with one reflective structure 500.

In a possible design, the heating assembly 200 has an air inlet 222. As shown in FIGS. 4 and 9, the furnace box 410 is provided with a second ventilation opening 412 facing the air inlet 222. The air inlet 222 of the heating assembly 200 is arranged on the protective case 220, so that external air is allowed to enter the protective case 220 by passing through the second ventilation opening 412 on the furnace box 410 and the air inlet 222 in sequence, thus sufficient oxygen is provided for continuous combustion of the burner structure 210.

In a specific embodiment, as shown in FIG. 5, the mounting plate 413 is arranged horizontally in the inner cavity 416 to divide the inner cavity 416 into a first chamber 414 and a second chamber 415. The first chamber 414 is located below the mounting plate 413, and the second chamber 415 is located above the mounting plate 413. The protective case 220 protrudes from the bottom surface to the upper surface of the mounting plate 413 through the mounting opening, such that the protective case 220 is located in the second chamber 415, and the reflective structure 500) is also located in the second chamber 415. The second ventilation opening 412 is specifically located on a side wall of the second chamber 415 close to the air inlet 222, so as to face the air inlet 222, which facilitates the external air entering into the protective case 220. The grill assembly 100 is mounted on a bottom part of the first chamber 414. A third opening is provided on a top part of the furnace box 410, communicating with the second chamber 415, and the iron plate assembly 300 covers the third opening, so that the reflective structure 500 in the second chamber 415 is in contact with the iron plate assembly 300, which allows the heat of the reflective structure 500 to be conducted to the iron plate assembly 300. Optionally, the second ventilation opening 412 may have a strip-like shape, and the number of the second ventilation opening 412 is multiple, and the plurality of second ventilation openings 412 are arranged at intervals.

In some optional embodiments, the heating assembly 200 also includes an air intake nozzle 221, and an air outlet of the air intake nozzle 221 faces the air inlet 222. The air intake nozzle 221 may communicate with a fuel-supplying device, so that fuel can be sprayed to the air inlet 222 through the air intake nozzle 221 for the combustion in the burner structure 210. The fuel may specifically be combustible substances such as coal gas, natural gas, and liquefied gas. As shown in FIGS. 4 and 9, the air intake nozzle 221 is specifically located between the air inlet 222 and the second ventilation opening 412. The number of heating assemblies 200 is three, that is, the number of protective cases 220 is also three, and one air intake nozzle 221 is correspondingly provided on the side of the air inlet 222 of each protective case 220 close to the second ventilation opening 412.

Figure 6:
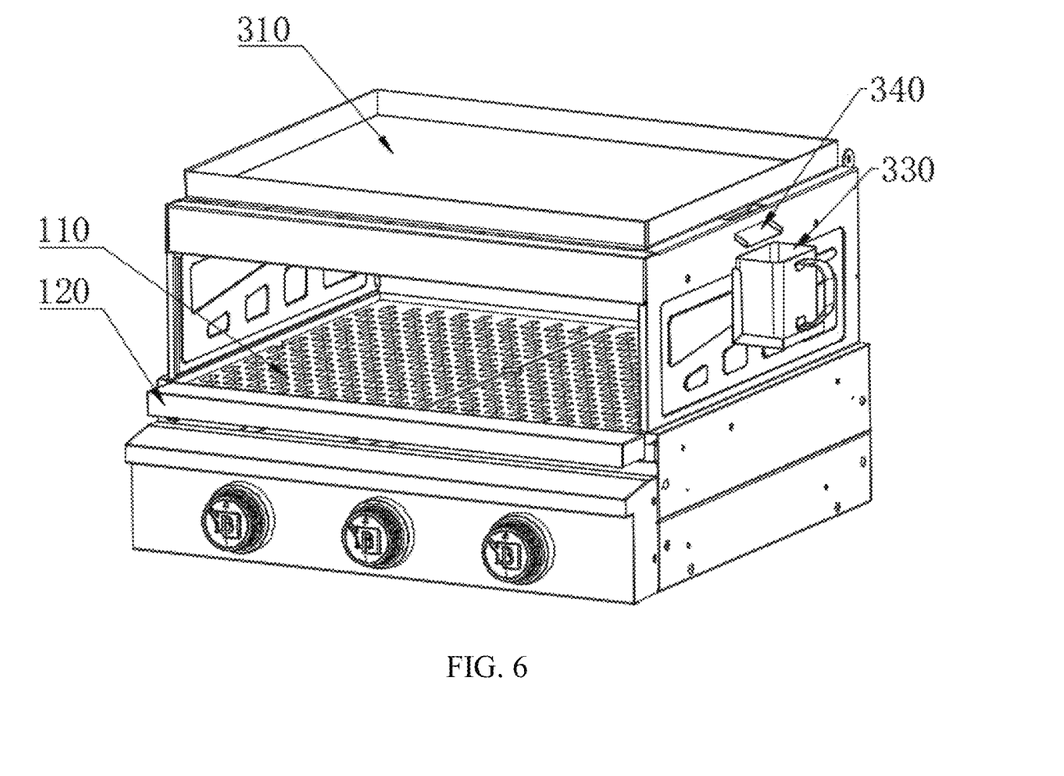
FIG. 6 is a third partial view of the grill according to an embodiment of the present application.
Figure 7:
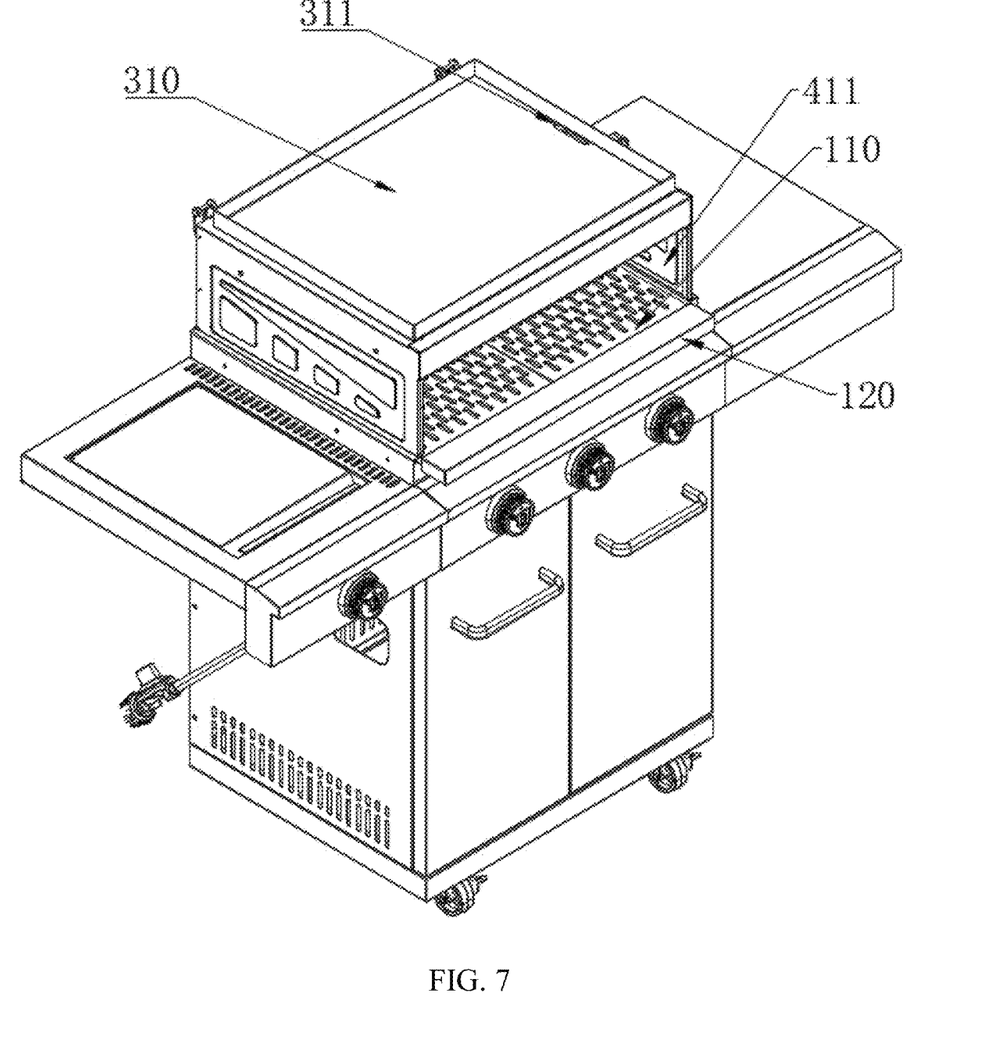
FIG. 7 is a fourth partial view of the grill according to an embodiment of the present application.

In a possible design, as shown in FIGS. 6, 7 and 9, the grill assembly 100 includes a grill grid 110, and sliding rails 417 are disposed in the inner cavity 416. The furnace box 410 has a second opening 411, which communicates with the inner cavity 416. The grill grid 110 is slidably mounted on the slide rails so that the grill grid 110 can be drawn out from the second opening 411. The grill grid 110 is used for placing food. When grilling, the grill grid 110 can be drawn out from the second opening 411, so as to flip the food or add seasonings outside the furnace box 410 for safety considerations for the user.

In a specific embodiment, the second opening 411 is specifically communicated with the first chamber 414. The number of the sliding rails 417 is two, and the two sliding rails 417 are horizontally arranged on opposite side walls of the first chamber 414 respectively. The grill assembly 100 also includes a sliding support 120, and the grill grid 110 is mounted over the sliding support 120. The sliding support 120 is located between two sliding rails 417 and is slidably mounted on the sliding rails 417, so as to allow the grill grid 110 to be slidably mounted on the sliding rails 417 through the sliding support 120. One side of the sliding support 120 protrudes out of the first chamber 414 through the second opening 411, thus when being drawn by the user, driving the grill grid 110 to slide relative to the furnace box 410.

In a specific embodiment, the number of the grill grid 110 is multiple. As shown in FIG. 6, the number of the grill grid 110 is two, and the two grill grids 110 are arranged side by side on the sliding support 120. Notches are respectively provided on opposite sides of each grill grid 110 so that the grill grids 110 can be easily removed.

In a possible design, as shown in FIG. 3, a first oil collector 130 is detachably mounted on the support assembly 400, located below the grill grid 110. When grilling the food, oil or sauce on the food may drip from the grill grid 110, by placing the first oil collector 130 under the grill grid 110, the oil and sauce dripping from the grill grid 110 can be collected. Due to the first oil collector 130 that is detachably mounted on the support assembly 400, the first oil collector 130 can be removed from the support assembly 400 and cleaned on a regular basis, thereby improving the sanitation and tidiness of the grill. Specifically, the first oil collector 130 may be a container such as a cup, a plate, or a box that can be used to receive oil.

In a specific embodiment, the first oil collector 130 has a cuboid structure, and two sliding grooves are horizontally arranged on the bottom part of the furnace box 410. The two sliding grooves are parallel to each other and spaced apart, and the first oil collector 130 is positioned between the two sliding grooves. Two opposite sides of the first oil collector 130 are respectively located in each sliding groove, so that the first oil collector 130 can be drawn out from the sliding grooves, thereby being removably mounted on the support assembly 400.

In a possible design, as shown in FIG. 3, a guiding structure 140 is disposed between the first oil collector 130 and the grill grid 110, for collecting the oil dripped from the grill grid 110. The guiding structure 140 is provided with a first oil outlet 141 located above a first oil inlet 131 of the first oil collector 130. The grill grid 110 has a plurality of through-holes, thus the oil can drip from any of the through-holes on the grill grid 110. Therefore, by providing the guiding structure 140, the oil dripped from the through-holes of the grill grid 110 can be collected, and the oil flowing into the guiding structure 140 flows out through the first oil outlet 141, and enters the first oil collector 130 through the first oil inlet 131 of the first oil collector 130.

In a specific embodiment, the guiding structure 140 includes an inclined plate and an oil outlet plate, and the first oil outlet 141 is located on the oil outlet plate. The inclined plate is arranged on an outer periphery of the oil outlet plate and inclined relative to the oil outlet plate, and a horizontally lower end of the inclined plate is connected with the oil outlet plate, and a higher end thereof is disposed around a region below the edge of the grill grid 110, so that the oil dripping from any through-hole of the grill grid 110 can drip onto the inclined plate. Since the lower end of the inclined plate is connected to the oil outlet plate, the oil on the inclined plate can flow to the oil outlet plate along the inclined plate, and then flow out through the first oil outlet 141 on the oil outlet plate.

In a possible design, the iron plate assembly 300 has a second oil outlet 311 that is communicated with a second oil collector 330, and oil on the iron plate assembly 300 flows into the second oil collector 330 through the second oil outlet 311. The second oil collector 330 collects the oil flowing down from the food on the iron plate assembly 300, so as to further improve the sanitation and cleanliness of the grill.

In a specific embodiment, the iron plate assembly 300 includes a grill pan 310, and the grill pan 310 is mounted on the top of the furnace box 410 and is covered on the third opening. The second oil outlet 311 is provided on the grill pan 310. As shown in FIG. 7, a guiding groove 340 is disposed below the second oil outlet 311 of the grill pan 310, a bottom face of the guiding groove 340 is inclined relative to the horizontal plane, and a horizontally lower end of the guiding groove 340 is located above a second oil inlet of the second oil collector 330. The oil on the grill pan 310 can flow into the guiding groove 340 through the second oil outlet 311, and then flow into the second oil collector 330 along the bottom face of the guiding groove 340. The structure of the second oil collector 330 may be the same as or different from that of the first oil collector 130. The second oil collector 330 is detachably mounted on a side face of the furnace box 410.

Optionally, as shown in FIG. 5, the iron plate assembly 300 also includes reinforcing rods 320, the number of reinforcing rods 320 is multiple. The plurality of reinforcing rods 320 are mounted on the top part of the furnace box 410, spaced apart around the third opening. The grill pan 310 is placed on the plurality of reinforcing rods 320, such that the structure at which the grill pan 310 is covered on the third opening is reinforced by the reinforcing rods 320. The top plate of the reflective structure 500 is specifically in contact with the bottom part of the reinforcing rods 320.

In a possible design, an upper cover 420 is covered on the iron plate assembly 300 to provide thermal insulation and prevent dust for the food on the iron plate assembly 300. The upper cover 420 is specifically connected to a top part of the side wall of the furnace box 410, and specifically, the upper cover 420 may be detachably connected or rotatably connected with the top part of the side wall of the furnace box 410.

In some optional embodiments, the support assembly 400 also includes a movable frame 430, and the furnace box 410 is mounted on the movable frame 430. Wheels 432 are provided on the bottom part of the movable frame 430 to enable the movement of the furnace box 410. The movable frame 430 has a cabinet used for storing items. The cabinet includes two doors 431, and the two doors 431 are respectively pivotably mounted on the movable frame 430 to open or close the cabinet.

In an optional embodiment, the direction to which the second opening 411 of the furnace box 410 faces is the front side, and the opposite side is the rear side. A knob is arranged on the bottom area of the front side of the furnace box 410. The heating assembly 200 includes a firing needle, and the knob is connected with the firing needle, so as to ignite through the knob. When there are a plurality of heating assemblies 200, the firing pin of each heating assembly 200 is correspondingly connected with one knob. The heating assembly 200 also includes an extinction-protecting structure. When the flame of the burner structure 210 is accidentally extinguished, the fuel supply to the heating assembly 200 is cut off through the extinction-protecting structure. The fuel may be combustible substances such as natural gas, coal gas, liquefied gas, and the like.

In an optional embodiment, as shown in FIG. 1, the left side of the furnace box 410 as indicated in FIG. 1 is provided with a side grill assembly 440, and side grill assembly 440 can also be used for heating food or keeping the food warm. A side platform assembly 450 is provided on the right side of the furnace box 410, and the side platform assembly 450 can be used to place items, such as food, condiment bottles, and the like.

Above embodiment merely show optional embodiments of the present application, and cannot be interpreted as the limitation to the present application. Any modifications, replacements and improvements made within the spirits and principles of the present application shall fall within the scope of protection of the present application.

What is claimed is:

1. A grill, comprising:
    a support assembly;
    a grill assembly;
    an iron plate assembly; and
    a heating assembly;
    wherein the grill assembly, the iron plate assembly, and the heating assembly are all mounted on the support assembly, the grill assembly is located below the heating assembly, and the iron plate assembly is located above the heating assembly, a reflective structure is covered over an upper area above the heating assembly, and the reflective structure is in contact with the iron plate assembly;
    wherein a first ventilation opening extends through a side wall of the reflective structure;
    a shielding structure is covered on one side of the first ventilation opening away from the heating assembly, and the shielding structure is connected to the side wall of the reflective structure; and
    a first opening is located between the shielding structure and the sidewall of the reflective structure, and the first opening is in communication with the first ventilation opening and faces upward or downward.

2. The grill according to claim 1, wherein the support assembly comprises a furnace box having an inner cavity, and a mounting plate is placed in the inner cavity; and
    wherein the heating assembly is mounted on the mounting plate, the grill assembly is mounted on a bottom part of the inner cavity, and the iron plate assembly is mounted on a top part of the furnace box.

3. The grill according to claim 2, wherein the heating assembly has an air inlet, and the furnace box is provided with a second ventilation opening facing the air inlet.

4. The grill according to claim 2, wherein the grill assembly comprises a grill grid, and sliding rails are arranged in the inner cavity, the furnace box has a second opening in communication with the inner cavity; and wherein the grill grid is slidably mounted on the sliding rails.

5. The grill according to claim 4, wherein a first oil collector is detachably mounted on the support assembly and the first oil collector is positioned under the grill grid.

6. The grill according to claim 5, wherein a guiding structure is disposed between the first oil collector and the grill grid, and the guiding structure is provided with a first oil outlet located above a first oil inlet of the first oil collector.

7. The grill according to claim 2, wherein the iron plate assembly has a second oil outlet, and the second oil outlet is communicated with a second oil collector, so that oil in the iron plate assembly enters the second oil collector through the second oil outlet.

8. The grill according to claim 7, wherein the heating assembly has an air inlet, and the furnace box is provided with a second ventilation opening facing the air inlet.

9. The grill according to claim 7, wherein the grill assembly comprises a grill grid, and sliding rails are arranged in the inner cavity, the furnace box has a second opening in communication with the inner cavity; and wherein the grill grid is slidably mounted on the sliding rails.

10. The grill according to claim 9, wherein a first oil collector is detachably mounted on the support assembly and the first oil collector is positioned under the grill grid.

11. The grill according to claim 10, wherein a guiding structure is disposed between the first oil collector and the grill grid, and the guiding structure is provided with a first oil outlet located above a first oil inlet of the first oil collector.

12. The grill according to claim 2, wherein a top cover is covered above the iron plate assembly.

13. The grill according to claim 12, wherein the heating assembly has an air inlet, and the furnace box is provided with a second ventilation opening facing the air inlet.

14. The grill according to claim 12, wherein the grill assembly comprises a grill grid, and sliding rails are arranged in the inner cavity, the furnace box has a second opening in communication with the inner cavity; and wherein the grill grid is slidably mounted on the sliding rails.

15. The grill according to claim 14, wherein a first oil collector is detachably mounted on the support assembly and the first oil collector is positioned under the grill grid.

16. The grill according to claim 15, wherein a guiding structure is disposed between the first oil collector and the grill grid, and the guiding structure is provided with a first oil outlet located above a first oil inlet of the first oil collector.

17. A grill, comprising:
a support assembly;
a grill assembly;
an iron plate assembly; and
a heating assembly;
wherein the grill assembly, the iron plate assembly, and the heating assembly are all mounted on the support assembly, the grill assembly is located below the heating assembly, and the iron plate assembly is located above the heating assembly, a reflective structure is covered over an upper area above the heating assembly, and the reflective structure is in contact with the iron plate assembly;
wherein the support assembly comprises a furnace box having an inner cavity, and a mounting plate is placed in the inner cavity;
the heating assembly is mounted on the mounting plate, the grill assembly is mounted on a bottom part of the inner cavity, and the iron plate assembly is mounted on a top part of the furnace box; and
the heating assembly has an air inlet, and the furnace box is provided with a second ventilation opening facing the air inlet.

18. A grill, comprising:
a support assembly;
a grill assembly;
an iron plate assembly; and
a heating assembly;
wherein the grill assembly, the iron plate assembly, and the heating assembly are all mounted on the support assembly, the grill assembly is located below the heating assembly, and the iron plate assembly is located above the heating assembly, a reflective structure is covered over an upper area above the heating assembly, and the reflective structure is in contact with the iron plate assembly;
wherein the support assembly comprises a furnace box having an inner cavity, and a mounting plate is placed in the inner cavity;
the heating assembly is mounted on the mounting plate, the grill assembly is mounted on a bottom part of the inner cavity, and the iron plate assembly is mounted on a top part of the furnace box; and
the grill assembly comprises a grill grid, and sliding rails are arranged in the inner cavity, the furnace box has a second opening in communication with the inner cavity; and
the grill grid is slidably mounted on the sliding rails.

* * * * *